Patented Mar. 27, 1928.

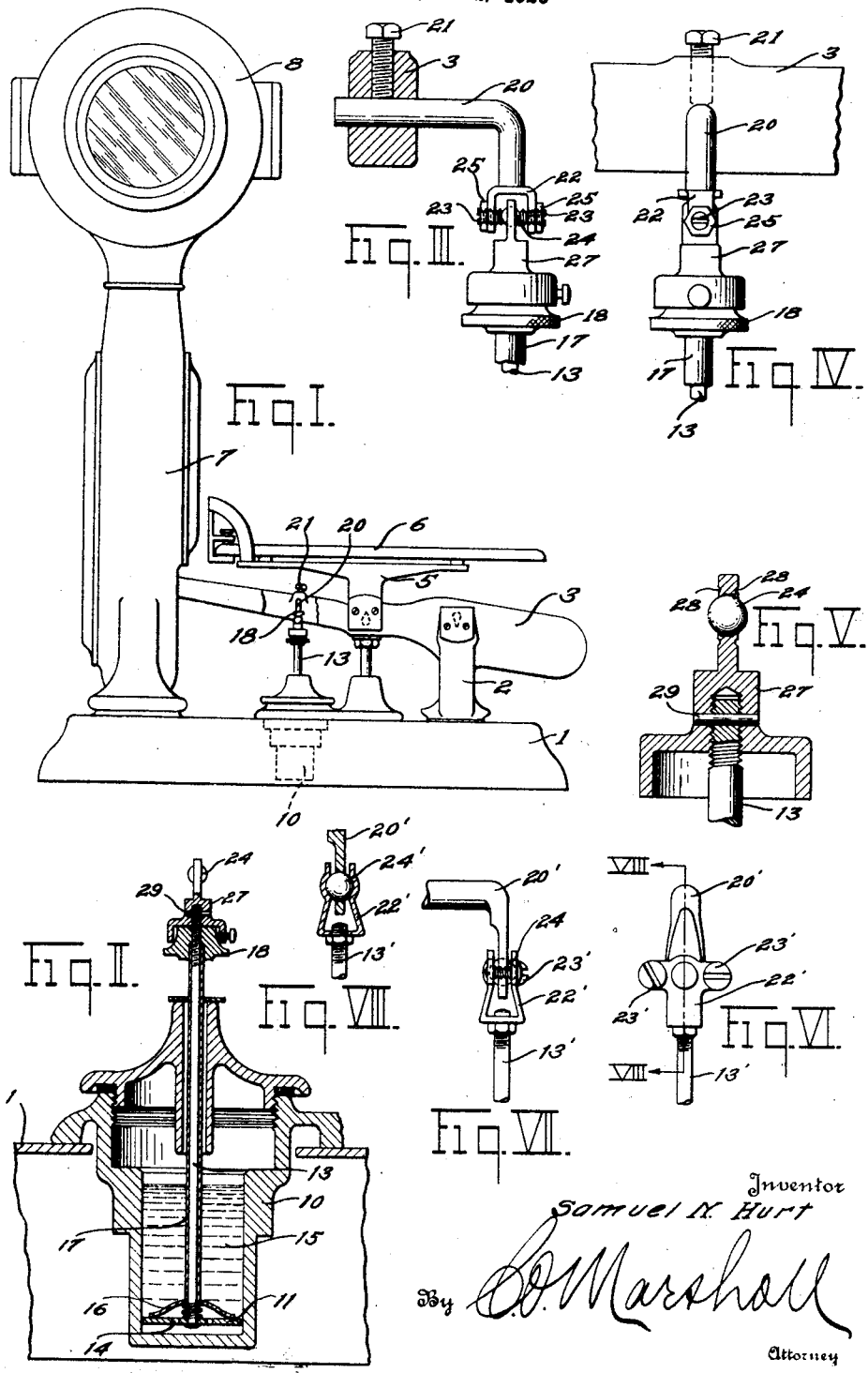

1,663,986

UNITED STATES PATENT OFFICE.

SAMUEL N. HURT, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed April 2, 1926. Serial No. 99,262.

This invention relates to weighing scales, and more particularly to means for connecting a vibration dampening device to the weighing mechanism.

One of the principal objects of this invention is the provision of a connection between a dash pot plunger and a movable element of a weighing scale which will permit of adequate angular movement of the plunger rod relative to the scale element to which it is connected to take care of the slight oscillatory movement of the plunger rod during weighing movements.

Another object of this invention is the provision of a suitable connection between the dash pot plunger and the weighing mechanism in which the element of friction is reduced to a minimum.

A further object of the invention is to provide a dash pot connecting means which may be easily and inexpensively manufactured and assembled without the use of special tools.

Other objects and advantages will be apparent from the following description, in which reference is had to the accompanying drawings illustrating preferred embodiments of my invention and wherein similar reference numerals designate similar parts throughout the several views.

In the drawings:—

Figure I is a side elevational view of a weighing scale embodying my invention;

Figure II is a fragmentary vertical sectional view through the vibration dampening means incorporated in the scale;

Figure III is an enlarged fragmentary detail view of the dash pot connection of my invention;

Figure IV is a side view of the parts illustrated in Figure III;

Figure V is an enlarged fragmentary detail sectional view of a portion of the dash pot connection;

Figure VI is an enlarged fragmentary detail view showing a modified form of the connection;

Figure VII is a side view of the connection shown in Figure VI;

Figure VIII is a fragmentary sectional detail view taken substantially on the line VIII—VIII of Figure VI.

Referring to the drawings in detail, I have illustrated the device of my invention as embodied in a weighing scale of the so-called cylinder type, but it is to be understood that my invention may be incorporated in any mechanism wherever the same may be found desirable, and, as the scale forms no part of my invention per se, I will only describe it in such detail as to show the connection of my invention therewith.

The scale consists substantially of a base 1 provided with an upwardly projecting standard 2 upon which is fulcrumed a lever 3, the lever having suitable load pivots which support a spider 5, the latter being surmounted by a load-receiving platform or commodity-receiver 6. The nose end of the lever 3 projects into an upright housing 7 erected upon one end of the base 1 and is suitably connected to a load-counterbalancing mechanism (not shown) supported within the housing and to indicating mechanism housed within a substantially cylindrical casing 8 surmounting the upright housing 7.

In order to dampen the vibrations or oscillations of the weighing mechanism during weighing operations I have provided a dash pot 10 having a plunger or piston 11 secured to the lower end of a rod 13, the rod being connected to the main lever 3 of the scale in a manner to be hereinafter explained. The plunger 11 is provided with openings 14 through which the oil or other suitable damping fluid 15 may pass, and a bell 16 fixed to the lower end of a sleeve 17 surrounding the rod 13 may be adjusted vertically so as to increase or decrease the rate of flow of fluid past the plunger 11 and thus virtually control the number and amplitude of the oscillations of the weighing mechanism, adjustment for the bell being provided in the form of a knurled thumb screw 18 secured to the upper extremity of the sleeve and threaded for rotation upon the rod 13.

The means for connecting the plunger rod to the lever 3, which is the salient feature of this invention, comprising a crank arm 20 adjustably secured in a bore in the lever 3 by means of a set screw 21. The lower end of the depending arm of the crank is provided with an inverted U-shaped member 22, the furcations of the member having threaded openings adapted to receive the screws 23, the ends of the screws adjacent each other being preferably concave in form and so adjusted as to securely engage a spherical ball 24 constructed of metal or other suitable material, the screws being held against accidental displacement by means of lock nuts 25. The ball 24 is positioned within an opening in the upwardly projecting portion of a member 27, and is retained therein by swaging the edges of the opening, as particularly shown in Figure V at 28. It is to be understood that the ball is not rigidly secured in the member 27 but is freely revoluble therein, care being taken that lost motion between the ball and its retaining member be reduced to a minimum and also that no appreciable friction is set up between the parts. The plunger rod 13 of the dash pot is threaded into the member 27 and secured against relative movement by means of a pin 29 inserted therethrough.

It will be obvious that as the main lever 3 of the scale moves during a weighing operation, the point of connection of the dash pot with the lever does not move in a straight line, but moves in an arc about the fulcrum pivot of the lever as the center. Such movement of the lever causes a relative movement of the parts at the point of connection. It will be apparent, however, that with a ball connection as hereinbefore described the friction set up between these parts will be reduced to a minimum and therefore no appreciable error will result in the scale from this cause.

In the modified form of device illustrated in Figures VI, VII and VIII the depending portion of the crank arm 20' is provided with an opening within which is positioned the metallic ball 24'. The furcations of a U-shaped member 22' secured to the dash pot plunger rod 13' are provided with depressions or pockets, as particularly illustrated in Figure VIII, which are adapted to receive and fixedly retain the ball 24', the furcations being held together by means of screws 23'. This construction is desirable in that the member 22' may be easily punched and formed from a piece of sheet metal.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, weighing mechanism including movable members, a metallic ball carried by one of said members, and means including a U-shaped element carried by the other of said members and fixedly engaging said ball to form a flexible joint between said members.

2. In a device of the class described, in combination, weighing mechanism including a movable member, a vibration dampening device having a movable member, a spherical member, one of said members having an opening adapted to receive the spherical member, means for loosely retaining the spherical member in said opening, and means carried by the other of said movable members engaging said spherical member to form a pivotal joint between said movable members.

3. In a device of the class described, in combination, weighing mechanism including a movable member, a vibration dampening device having a movable member, a spherical member, one of said members having an opening adapted to receive the spherical member, means for loosely retaining the spherical member in said opening, and adjustable means carried by the other of said movable members engaging said spherical member to form a pivotal joint between said movable members.

4. In a device of the class described, in combination, weighing mechanism including relatively movable elements, a spherical member carried by one of said elements, and adjustable means carried by the other of said elements and embracing said spherical member to form a flexible joint between said elements.

5. In a device of the class described, in combination, weighing mechanism including a movable member, a vibration dampening device having a movable member, one of said members being provided with a spherical member, and adjustable means carried by the other of said members engaging said spherical member to form a flexible joint between said members.

6. In a device of the class described, in combination, weighing mechanism including a lever, a vibration dampening dash pot having a plunger provided with a stem, means for connecting said lever and said plunger stem including a ball revolubly secured to the upper end of said stem, a member connected to said lever and embracing said ball, and a pair of set screws threaded into said member and engaging said ball.

SAMUEL N. HURT.